United States Patent [19]
Nakao et al.

[11] Patent Number: 5,363,705
[45] Date of Patent: Nov. 15, 1994

[54] VORTEX GENERATOR HAVING A PROTRUSION FORMED AT AN UPSTREAM SURFACE

[75] Inventors: Yuichi Nakao; Masao Misumi; Naoki Matsubara, all of Tokyo, Japan

[73] Assignee: Oval Corporation, Tokyo, Japan

[21] Appl. No.: 93,215

[22] Filed: Jul. 19, 1993

[30] Foreign Application Priority Data

Jul. 20, 1992 [JP] Japan .................. 4-214643

[51] Int. Cl.$^5$ .............................. G01F 1/32
[52] U.S. Cl. ................................. 73/861.22
[58] Field of Search ........... 73/861.22, 861.23, 861.24, 73/861.21

[56] References Cited

U.S. PATENT DOCUMENTS

| 3,572,117 | 3/1971 | Rodely | 73/861.22 |
| 3,589,185 | 6/1971 | Burgess | 73/861.22 |

FOREIGN PATENT DOCUMENTS

| 0107641 | 5/1984 | European Pat. Off. . |
| 2444928 | 7/1980 | France . |
| 2093997 | 9/1982 | United Kingdom . |
| 8502970 | 7/1985 | WIPO . |

OTHER PUBLICATIONS

A Flow Visulaization Around a Obstacle in a Parallel Channel, K. Takase et al., Japan Atomic Energy Research Institute, vol. 6, No. 22, 1986–1987, pp. 159–162.

Primary Examiner—Herbert Goldstein
Assistant Examiner—Harshad Patel
Attorney, Agent, or Firm—Jordan and Hamburg

[57] ABSTRACT

A vortex flow meter capable of operating with minimum piping effect is disclosed. A stream-lined protrusion, extending toward the upstream side is disposed at the upstream surface 2 of a vortex generator joined to the inner wall 1 of a flow pipe in order to remove thereat horseshoe vortexes produced in front of the vortex generator. Therefore, the possible affection of horseshoe vortexes, that may considerably depend upon the piping conditions, can be eliminated.

8 Claims, 5 Drawing Sheets

VORTEX GENERATOR HAVING A PROTRUSION FORMED AT AN UPSTREAM SURFACE

BACKGROUND OF THE INVENTION

The present invention relates to a vortex flow generator and, more particularly, to a vortex flow generator which is constructed and operated with a minimum amount of error as regards its instrumental function even when there is a change in the velocity of the flow's distribution due to the configuration of the flow's piping.

An inferential type of flow meter is an instrument for determining the quantity of fluid or the velocity of the fluid's flow by measuring the physical quantity of the fluid produced in relation to the fluid's flow. To assure a certain relationship between the fluid's flow and the corresponding physical quantity of the fluid it is necessary to keep a constant state of the fluid's flow to be measured. For this reason, in order to attain the required accuracy of the inferential type of flow meter, it is necessary to provide a flow-rectifying device at the upstream side in the flow pipe wherein the flow meter is installed. Constructions of flow-rectifying devices and piping conditions for orifice and turbine flow meters are defined by the international standard and the national standard.

It is well known that a vortex flow meter is related to an inferential type of flow meter which utilize a number of Karman's vortexes produced by a vortex generator installed in a flow pipe and which is substantially proportional to the flow rate of the fluid within a certain range of Reynolds number. This proportional constant is called the Strouhal number. In an ideal vortex flow meter, the Strouhal number can be kept at a constant value even when the Reynolds number varies. In other words, the ideal vortex flow meter has a constant characteristic (Strouhal number) in a wide range of the fluid's flow and is least affected by the physical properties of a fluid and the conditions of the piping. However, any practical vortex flow meter has a Strouhal number depending on a Reynolds number and its characteristic may be affected by the piping's conditions.

A conventional vortex flow meter has a simple construction where a vortex generator is disposed at a right angle to the axis of the fluid's flow inside a cylindrical body. Many proposals for the shape and quantity of the vortex generators and the internal construction of the vortex flow meter have been made to keep the Strouhal number of the flow meters at a constant value against the Reynolds number. For example, one of the proposals was the improvement of the ratio d/D (width "d" of a vortex generator in perpendicular direction to the fluid's flow and an inside diameter "D" of the body) and a vortex detecting position. Especially, most available vortex flow meters have a ratio d/D being nearly equal to 0.28 in order to aim at obtaining the characteristic satisfying the stable two-dimensional conditions of the ideal Karman's vortex street.

However, any practical vortex flow meter does not detect Karman's vortexes produced by a two-dimensional flow but rather those produced by a three-dimensional flow. Consequently, the characteristic of the vortex flow meter varies depending upon a change in the three-dimensional flow. For example, a bent pipe (including an elbow portion), reducer, diffuser, valve, branch pipe and collector may produce a rotational flow and deflect the flow of the fluid which in turn causes a change in the instrumental error of the vortex flow meter. A flow rectifier is provided to eliminate the above-mentioned irregularity of flow. Components of the rotational flow and the deflected flow may still remain in the flow of the fluid-passing through the vortex flow meter, which affects the flow meter's instrumental error.

SUMMARY OF THE INVENTION

It is an object of the present invention to provide a vortex flow meter which is reliable in measuring and capable of operating with a minimum amount of instrumental error possibly caused by the configuration of the flow pipe wherein it is installed.

It is another object of the present invention to provide a vortex flow meter capable of operating with a minimum effect on the piping by eliminating the possibility of producing horseshoe vortexes around the upstream portion of a vortex generator.

It is another object of the present invention to provide a vortex flow meter comprising a vortex generator joined to the inner wall of a flow pipe having a protrusion which is formed at the upstream surface of the vortex generator, fronting the fluid's flow and extending toward the upstream side along the inner wall of the flow pipe.

DETAILED DESCRIPTION OF THE INVENTION

First, the operating principal of a vortex flow meter, according to the present invention is described as follows:

Conventionally, a vortex flow meter is intended to detect vortexes produced by a vortex generator in a fluid passing therethrough. In a practical vortex flow meter, Karman's vortexes and horseshoe vortexes are produced which interfere with each other and thereby interfere with vortexes which are detected. The horseshoe vortexes may be produced archwise in front of a vortex generator in a boundary layer along the inner wall of a flow pipe and are divided into two vortex tubes moving along both sides of the vortex generator.

These vortex tubes can interfere with Karman's vortex tubes leaving from the sides of the vortex generator.

Figure 1:
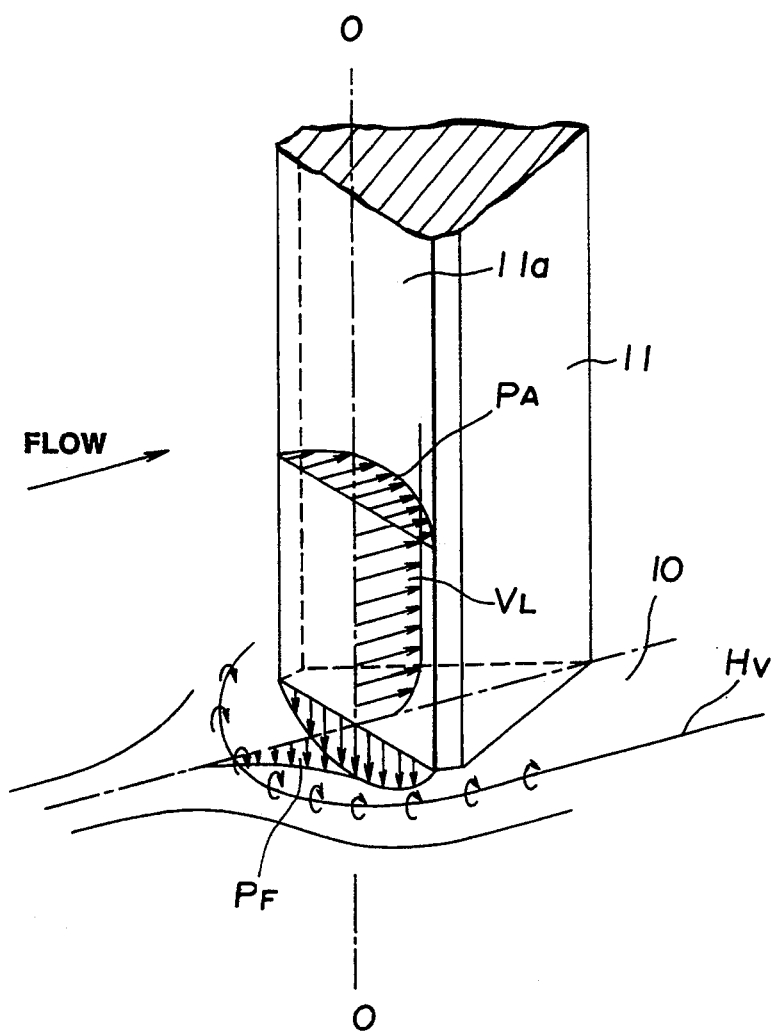
FIG. 1 is a partial view for explaining horseshoe vortexes.

FIG. 1 is a partially cutaway perspective view for explaining a horseshoe vortex. The numeral 10 designates the inner wall of a flow pipe and the numeral 11 designates vortex generator. In FIG. 1, the vortex generator 11 has a section in the form of an isosceles triangle with the base facing the fluid's flow and a flow pipe which has a flat inner wall 10. The vortex generator 11 is installed on the inner wall 10 of the flow pipe at a right angle to the direction of the fluid's flow, indicated by an arrow. The fluid's flow pressure applied on the vortex generator 11 is distributed in such a way that the pressure of the main flow, along an upstream surface 11a of the vortex generator 11, is high at the center axis O—O of a curve $P_A$ and decreases in the direction toward both sides of the vortex generator 11.

The fluid's flow has a velocity $V_L$ decreasing as it approaches the boundary with the inner wall 10 of the flow pipe as shown in FIG. 1. The pressure is also reduced as the velocity decreases. Consequently, the pressure $P_A$, applied by the main flow, decreases in the direction from the upstream surface 11a of the vortex generator 11 to the pipe's wall 10 whereon the pressure $P_F$, decreases in the direction toward the upstream side. This results in that a boundary layer of fluid flow is divided to form horseshoe vortexes $H_V$.

Since these horseshoe vortexes $H_V$ depend upon the velocity of the flow velocity of a fluid along the upstream surface of tile vortex generator 11, they may vary in size and symmetry if the main flow includes deflected flow and a rotational flow and, therefore, the effect of the horseshoe vortexes interfering with a street of Karman's vortexes (not shown), produced by the vortex generator 11, can also change. The change in the interference effect may cause a change in the instrumental error of the vortex flow meter, i.e., a change in the Strouhal number.

The visualization of the horseshoe vortexes is described in the printed material "A flow visualization around a protrusion in a parallel channel" ("Flow visualization", Vol. 6 No. 22, 1986-7). This paper reports that when a cubic body, whose height is substantially equal to the thickness of a boundary layer of water flowing therealong, is installed in a water bath, horseshoe vortexes may be produced around the cubic body but they also may disappear if the cubic body is elongated by tapering in the flows direction.

Figure 2:
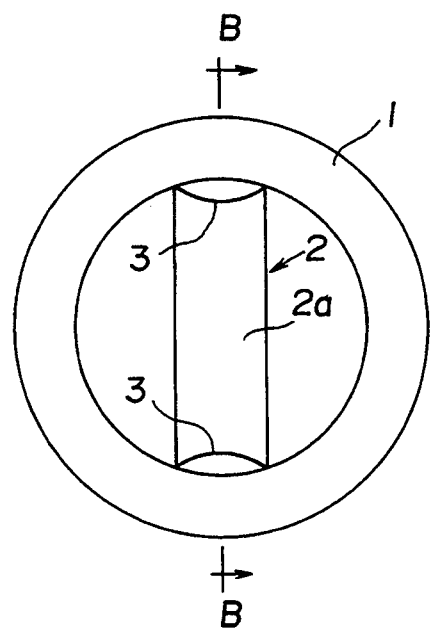
FIGS. 2a, 2b are views for explaining an example of a construction of a vortex flow generator embodied in the present invention.
Figure 2:
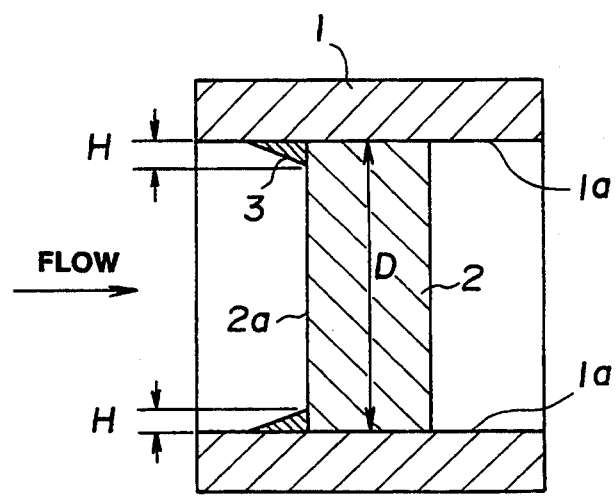

FIGS. 2(a) and 2(b) are views for explaining an example of the construction of a vortex flow generator according to the present invention: FIG. 2(a) is a front view of the vortex flow generator as viewed from the flow's direction and FIG. 2(b) is a section taken along line B—B of FIG. 2(a). Numerals 1, 2 and 3 denote a flow pipe, a vortex generator and protrusion respectively.

In FIGS. 2(a) and 2(b), the vortex generator 2 has a uniform section in the form of an isosceles triangle with its base directed to the upstream side of the flow pipe for fluid flowing in the direction shown by an arrow and it is installed on the diametrical axis of the cylindrical section of the flow pipe 1 in such a way that its upstream surface is disposed at a right angle to the fluid's flow in the flow pipe 1.

Stream-lined protrusions 3, extending in the upstream direction, are provided at both joints of the upstream (front) surface 2a of the vortex generator 2. The height H of each protrusion 3 at the upstream surface 2a of the vortex generator 2 is desirable to substantially equal the thickness of boundary layer of the fluid flowing at a low flow rate so that $H \leq 1/6\,D$ (D: diameter of a flow pipe) and the length of the protrusion on the inner wall of the pipe in the direction of the fluid's flow may be within the range of H to 3H. The stream-lined protrusions 3 may be formed integrally with the vortex generator in order to be secured to the inner wall 1a of the flow pipe 1 or separately to be secured to the upstream surface of the vortex generator 2. While the above-mentioned vortex generator 2 has a section in the form of an isosceles triangle with its base directed to the upstream side, it may be made in a shape of trapezoidal form, a circular one or any other form.

Thus formed protrusions 3 are effective to eliminate the possibility of producing horseshoe vortexes in front of a vortex generator 2. Namely, the fluid flowing along the inner wall 1a of the flow pipe 1 moves over the protrusions 3 and reaches the upstream surface 2a of the vortex generator 2. This flow reduces the pressure $P_F$ against the inner wall of the flow pipe as shown in FIG. 1 and thereby prevents horseshoe vortexes.

Figure 3:
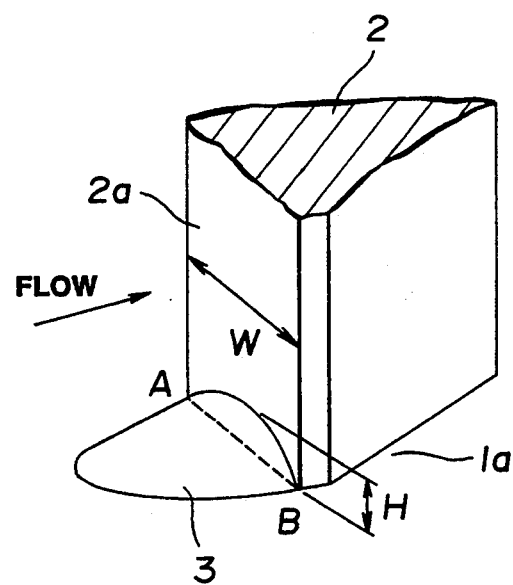
FIG. 3 is a view for explaining a vortex flow generator embodied in the present invention.

FIG. 3 is a partially cutaway perspective view for explaining a vortex flow generator embodied in the present invention. A protrusion 3 faces an upstream surface 2a of a vortex generator at its circular, arched surface that has a chord being a straight line joining the both side edges A and B of a vortex generator 2 with the inner wall 1a of a flow pipe.

The height H of the arch of the protrusion above the inner wall 1a of the flow pipe may be gradually reduced in the direction toward a given position on the upstream-side inner wall of the flow pipe. The whole protrusion is made in the form of a wedge.

As regards to the length of the protrusion 3 in the direction of the fluid's flow, along the inner wall 1a of the flow pipe, it is preferable to keep it within the range of H to 3H.

Figure 4:
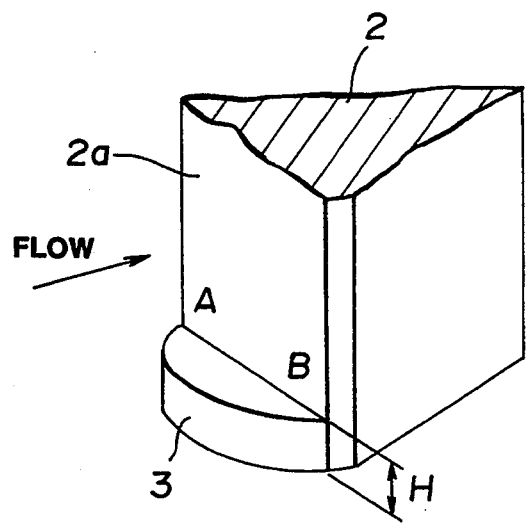
FIG. 4 is a partially cutaway perspective view for explaining another embodiment of a vortex flow generator according to the present invention.

FIG. 4 is a partially cutaway perspective view for explaining another embodiment of a vortex flow generator according to the present invention. In the shown case, protrusion 3 is a flat circular, arched plate of the thickness H that has a chord defined between both sides A and B, of a vortex generator 2.

Figure 5:
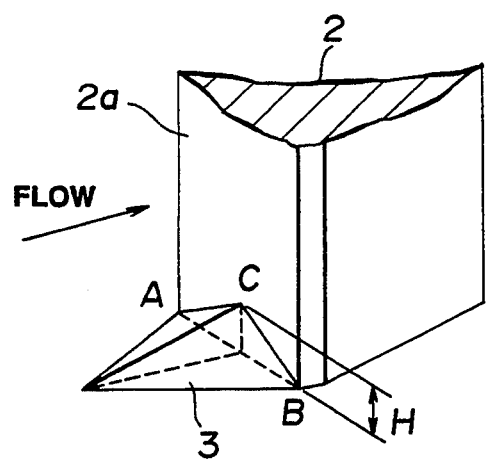
FIG. 5 is a partially cutaway perspective view for explaining a further embodiment of a vortex flow generator, according to the present invention.

FIG. 5 is a partially cutaway perspective view for explaining a further embodiment of a vortex flow generator according to the present invention, wherein protrusion 3 is a quadrangular pyramid having an isosceles triangle as its base, described by line segments joining both side edges A and B, of a vortex generator 2 and a vertex C of the height H at the center portion thereof.

Figure 6:
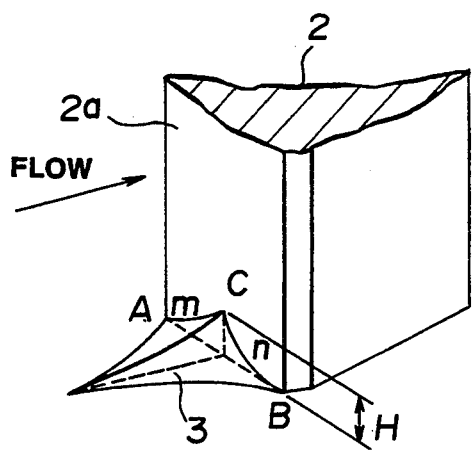
FIG. 6 is a partially cutaway perspective view for explaining still another embodiment of a vortex flow generator, according to the present invention.

FIG. 6 is a partially cutaway perspective view for explaining still another embodiment of a vortex flow generator according to the present invention. In the illustrated embodiment, a protrusion 3 is made in the form of an arrowhead that has a triangular base defined by curved line sides "m" and "n" with an apex C of a height H at the center of a chord between both side edges A and B, of a vortex generator 2. The height H of the apex C of the triangle is gradually reduced in the direction of the inner wall of a flow pipe.

Figure 7:
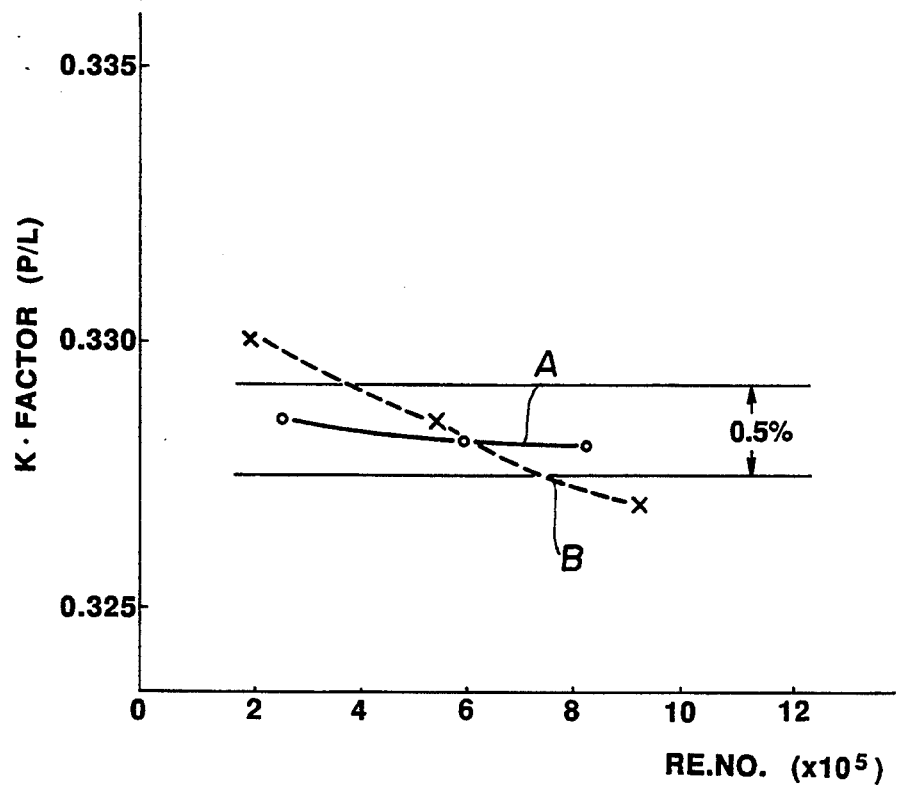
FIG. 7 is a graph showing an example of an instrumental error characteristic of a vortex flow generator, according to the present invention.

FIG. 7 is a graph showing an example of an instrumental error characteristic of a vortex flow meter according to the present invention. The graph indicates a Reynolds number (Re. No.) on the axis of abscissas and a flow coefficient (K-factor, liter per pulse) on the axis of the ordinates. A vortex generator 2 is provided with protrusions 3 in the form of a flat circular arched plate as shown in FIG. 4. The thickness (H) of each protrusion is 7 millimeters. The vortex generator 2 has a length of (D)=151 millimeters and a width of (W)=42 millimeters. The conditions of the pipes are as follows: The length of the upstream straight pipe is equal to 100D and the testing fluid is water.

Curve A shows an instrumental error of a vortex flow meter according to the present invention and curve B shows an instrumental error of a conventional vortex flow meter which has a vortex generator with no protrusion 3. The curve B indicates that the K-factor increases in a range of low values of the Reynolds number and there is a deviation of about 1% at the Reynolds number=$2 \sim 9 \times 10^5$. On the contrary, as is apparent from the curve A, the vortex flow meter according to the present invention, has an improved deviation of about 0.15% of substantially same range as the Reynolds number.

Figure 8:
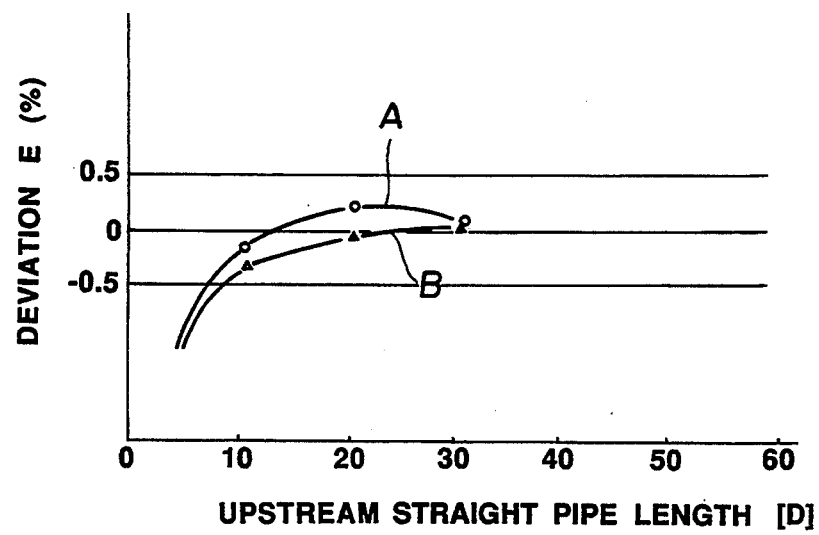
FIG. 8 is a graph showing an example of a piping effect characteristic of a vortex flow generator, according to the present invention.

FIG. 8 shows an example of a piping effect characteristic of a vortex flow meter according to the present invention. The graph indicates the length D of a straight pipe from the vortex flow meter to a double planes elbow (doubly bent at 90° out of a plane) on the axis of abscissas and an instrumental error (E) on the axis of ordinates. It shows how the length D of the straight pipe, between the cubic double elbow and a vortex generator, provided with protrusions, exerts an effect on the instrumental error (E) of the vortex flow meter. The test fluid is kerosene. Curves A and B indicate an instrumental error at the Reynolds number of $3 \times 10^5$ and $7 \times 10^5$ respectively.

The piping, having a cubic double elbow may be considered to be in its worst condition wherein the fluid's flow may include a complicated rotational flow and a deflected flow. The vortex flow meter, according to the present invention can hardly be affected by piping of the length 10D of the upstream straight pipe. The curves A and B indicate that the instrumental error of the flow meter with a straight pipe length of 30D is almost eliminated even when the Reynolds number varies.

As is apparent from the foregoing, according to the present invention, it is possible to provide a vortex flow meter capable of operating with a minimum effect on the piping in its accuracy of measurement and wherein protrusions extending toward the upstream side along the inner wall of a flow pipe, are provided, one at the joining portions of the upstream surface of a vortex generator to the inner wall of the flow pipe to eliminate the possibility of producing horseshoe vortexes around the upstream portion of the vortex generator, i.e., a mutual interference of the horseshoe and Karman vortexes, which may considerably vary in dependence upon the piping effect and cause an instrumental error in the vortex flow meter.

We claim:

1. A vortex flow means comprising a flow pipe and a vortex generator disposed at a right angle to the fluid's flow along the flow pipe for determining the flow rate of the fluid from a quantity of vortexes generated per unit of time from the vortex generator, said vortex generator having an upstream surface, said pipe having an upstream side upstream of said vortex generator, said vortex generator being joined to an inner wall of the flow pipe by a protrusion which is formed at the upstream surface of the vortex generator fronting the fluid's flow and extending toward the upstream side along the inner wall of the flow pipe, said protrusion having a cylindrical surface and a circular arched section with a chord defined between both side edges of the vortex generator on the inner wall of the flow pipe and with a top height being gradually reduced in the direction toward a given position on the upstream side of the inner wall of the flow pipe.

2. A vortex flow means according to claim 1 wherein said protrusion has a height on the upstream surface of the vortex generator and a length of one to three times said height in the direction of the fluid's flow.

3. A vortex flow means comprising a flow pipe and a vortex generator disposed at a right angle to the fluid's flow along the flow pipe for determining the flow rate of the fluid from a quantity of vortexes generated per unit of time from the vortex generator, said vortex generator having an upstream surface, said pipe having an upstream side upstream of said vortex generator, said vortex generator being joined to an inner wall of the flow pipe by a protrusion which is formed at the upstream surface of the vortex generator fronting the fluid's flow and extending toward the upstream side along the inner wall of the flow pipe, said protrusion being a circular arched flat plate having a chord defined between both side edges of the vortex generator.

4. A vortex flow means according to claim 3 wherein said protrusion has a height on the upstream surface of the vortex generator and a length of one to three times said height in the direction of the fluid's flow.

5. A vortex flow means comprising a flow pipe and a vortex generator disposed at a right angle to the fluid's flow along the flow pipe for determining the flow rate of the fluid from a quantity of vortexes generated per unit of time from the vortex generator, said vortex generator having an upstream surface, said pipe having an upstream side upstream of said vortex generator, said vortex generator being joined to an inner wall of the flow pipe by a protrusion which is formed at the upstream surface of the vortex generator fronting the fluid's flow and extending toward the upstream side along the inner wall of the flow pipe, said protrusion being a quadrangular pyramid having a base that is an isosceles triangle having one side extending between both side edges of the vortex generator and its two sides of equal length having a vortex at its center.

6. A vortex flow means according to claim 5 wherein said protrusion has a height on the upstream surface of the vortex generator and a length of one to three times said height in the direction of the fluid's flow.

7. A vortex flow means comprising a flow pipe and a vortex generator disposed at a right angle to the fluid's flow along the flow pipe for determining the flow rate of the fluid from a quantity of vortexes generated per unit of time from the vortex generator, said vortex generator having an upstream surface, said pipe having an upstream side upstream of said vortex generator, said vortex generator being joined to an inner wall of the flow pipe by a protrusion which is formed at the upstream surface of the vortex generator fronting the fluid's flow and extending toward the upstream side along the inner wall of the flow pipe, said protrusion being an arrowhead having a triangular base having a chord defined between both side edges of the vortex generator and two curved sides with an apex at the center portion thereof, said triangular base height being gradually reduced toward the upstream side inner wall of the flow pipe to form other surfaces with a common vortex thereon.

8. A vortex flow means according to claim 7 wherein said protrusion has a height on the upstream surface of the vortex generator and a length of one to three times said height in the direction of the fluid's flow.

* * * * *